United States Patent
Jameson

(10) Patent No.: US 8,202,169 B2
(45) Date of Patent: Jun. 19, 2012

(54) GREASE TRAP

(75) Inventor: Jonathan Jameson, Dalton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 319 days.

(21) Appl. No.: 12/624,758

(22) Filed: Nov. 24, 2009

(65) Prior Publication Data

US 2010/0135714 A1 Jun. 3, 2010

Related U.S. Application Data

(60) Provisional application No. 61/200,777, filed on Dec. 3, 2008.

(51) Int. Cl.
*F16N 1/00* (2006.01)
*F16F 15/121* (2006.01)

(52) U.S. Cl. .......................... 464/7; 464/68.1
(58) Field of Classification Search ............. 464/7, 16, 464/62.1, 64.1, 66.1, 67.1, 68.1–68.92; 192/30 V, 192/55.61, 70.17, 204, 213.11, 213.12, 213.21–214.1
See application file for complete search history.

(56) References Cited

U.S. PATENT DOCUMENTS

| 4,667,968 | A | 5/1987 | Nash et al. |
| 5,246,399 | A * | 9/1993 | Yanko et al. ............... 464/68.7 |
| 6,620,048 | B2 * | 9/2003 | Gillmann et al. ............ 464/7 |
| 6,692,007 | B2 | 2/2004 | Oldenburg |
| 2005/0220532 | A1 * | 10/2005 | Trotter et al. |

* cited by examiner

*Primary Examiner* — Gregory Binda
*Assistant Examiner* — Josh Skroupa
(74) *Attorney, Agent, or Firm* — Simpson & Simpson, PLLC

(57) ABSTRACT

A transmission system including a damper having a hysteresis package and a flange, wherein the flange includes a first set of splines, an input shaft having a second set of splines arranged about an interior of the input shaft, wherein the first set of splines form an engagement with the second set of splines for transferring torque between the input shaft and the flange, wherein grease is included between the first and second sets of splines for lubricating the engagement of the input shaft and the flange, and a grease trap mounted to the flange located between the input shaft and the hysteresis package for restricting the grease from traveling radially down the flange and into the hysteresis package.

7 Claims, 3 Drawing Sheets

GREASE TRAP

FIELD OF THE INVENTION

This application claims the benefit under 35 U.S.C. §119 (e) of U.S. Provisional Application No. 61/200,777, filed Dec. 3, 2008.

The invention relates to transmission systems, more specifically to transmission systems each including a splined input shaft, a complimentarily splined damper flange, and a grease trap for retaining grease proximate to the input shaft.

BACKGROUND OF THE INVENTION

Transmission systems, dry transmissions particularly, are known in the art each including a splined input shaft which engages a complimentarily splined flange of a damper of the transmission system for transmitting the torque between the input shaft and the damper flange.

Grease is often used to lubricate the engagement of the flange splines with the input shaft splines, so that some degree of relative axial movement along the splines is possible between the input shaft and the flange. During assembly of the transmission system, prior to the engagement of the input shaft and the flange, grease is added to the splines of one or both of these parts. As the shaft and flange are fully engaged, some grease is stripped off of the splines, and gathers at the end of the shaft near the base of the flange. This grease may travel radially down the flange, away from the axis of rotation of the shaft and flange, due to centrifugal forces which are created by the rotation of the flange and input shaft.

While traveling down the flange, the grease may interfere with other components of the transmission system, such as a hysteresis or friction package of the damper. If the grease lubricates the hysteresis package, the damper will no longer work properly, negatively affecting the NVH, or noise, vibration, harshness characteristics of the damper.

U.S. Pat. Nos. 4,667,968 (Nash et al.) and 6,692,007 (Oldenburg) each teach a lip seal between the flange and input shaft for retaining grease. However, the lip seals taught in these references require a retention feature for holding the seals, so that the seals can in turn retain the grease. In order to install the lip seals, additional parts are required, and therefore a substantial amount of additional time and cost are also necessary. Furthermore, the lip seals occupy a substantial amount of room and therefore reduce the space that the splines can occupy, which will detrimentally affect performance of the transmission system.

Therefore, what is needed is a cost effective grease trap that is simple to install into a transmission for retaining grease proximate to the input shaft and out of a hysteresis package of the transmission.

BRIEF SUMMARY OF THE INVENTION

The present invention broadly comprises a transmission system including a damper having a hysteresis package and a flange, wherein the flange includes a first set of splines, an input shaft having a second set of splines arranged about an interior of the input shaft, wherein the first set of splines form an engagement with the second set of splines for transferring torque between the input shaft and the flange, wherein grease is included between the first and second sets of splines for lubricating the engagement of the input shaft and the flange, and a grease trap mounted to the flange located between the input shaft and the hysteresis package for restricting the grease from traveling radially down the flange and into the hysteresis package.

In one embodiment, the flange includes a plurality of apertures, wherein the grease trap includes a plurality of snaps, with each snap corresponding to one of the apertures, wherein the grease trap is mounted to the flange by inserting the snaps into the apertures. In a further embodiment, each of the snaps includes two prongs and a gap between the prongs, wherein each prong terminates in a one-way catch having an angled portion for enabling the one-way catch to pass through the apertures in a first direction, and wherein the one-way catch includes a catch portion for preventing the snaps from exiting the apertures in a second direction which is opposite from the first direction.

In one embodiment, the grease trap includes a spring-loaded portion for pressing the grease trap against the flange for preventing grease from getting by the grease trap. In another embodiment, the grease trap includes a deflection portion for deflecting the grease away from the hysteresis package and towards the input shaft. In yet another embodiment, the grease trap is fabricated from spring steel. In another embodiment, the grease trap is mounted to the flange by use of rivets, bolts, machine screws, or welding.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
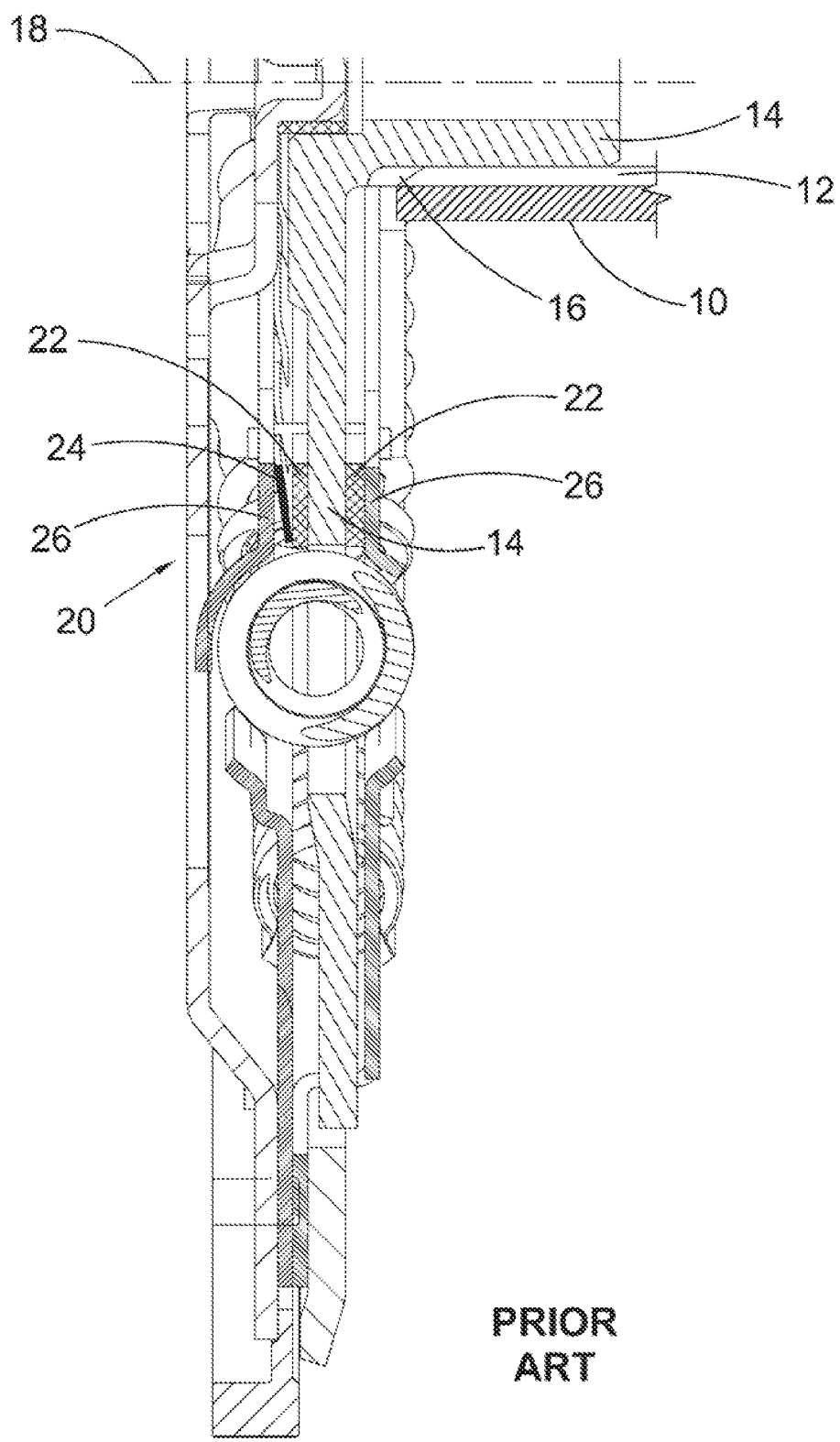
FIG. 1 is a cross-sectional view of a portion of a transmission system including an input shaft, damper flange, and hysteresis package.
Figure 2:
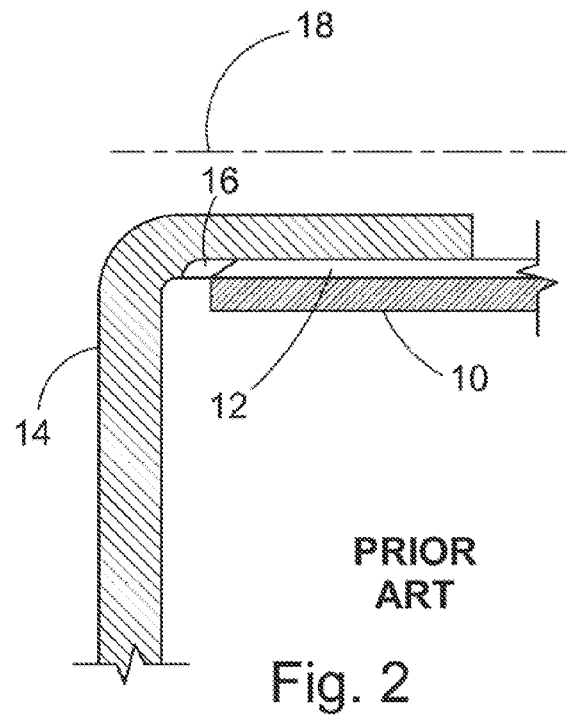
FIG. 2 is an enlarged view of the input shaft and flange shown in FIG. 1.

Referring now to the drawings, FIG. 1 illustrates a portion of a transmission system including input shaft 10 having internal splines 12, with flange 14 including splines 16. The shown input shaft is hollow, therefore having internal splines. Both input shaft 10 and flange 14 rotate about axis 18. Therefore, it should be clear that only the bottom half of the shaft, flange, and other components are shown. An enlarged view of the engagement of input shaft 10 and flange 14 is shown in FIG. 2.

Figure 3:
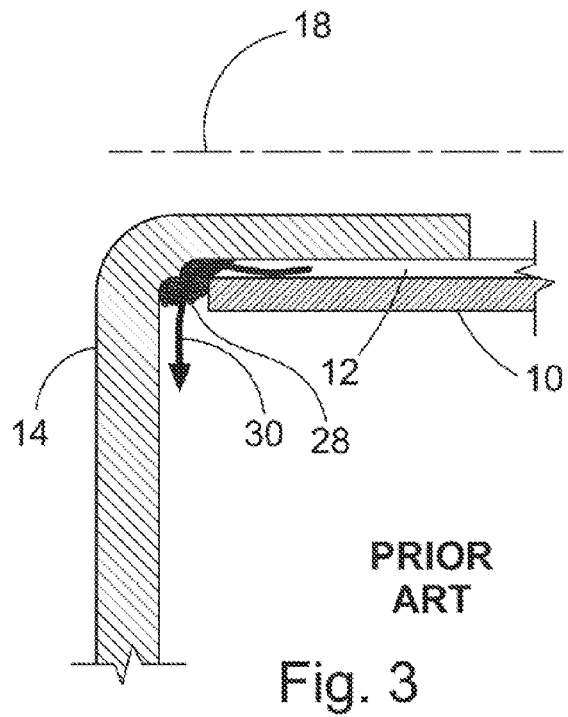
FIG. 3 is a view similar to FIG. 2 illustrating a collection of grease proximate to the input shaft and flange.

The damper which includes flange 14 also includes hysteresis or friction package 20. It can be seen that hysteresis package 20 includes friction plates 22 on either side of flange 14, diaphragm spring 24 to press against the friction plates, and cover plates 26 to generally house the components of the hysteresis package. During assembly of the transmission system, grease 28 is stripped off the splines and gathers at the end of the shaft, as shown in FIG. 3. The grease then travels down the flange towards the hysteresis package as indicated by the direction of arrow 30. The performance of hysteresis package 20 is dependent on the friction plates providing the proper amount of frictional forces. If the grease enters the hysteresis package and lubricates friction plates 22 of the hysteresis package, the frictional forces will be reduced, and the damper will not function properly.

Figure 4:
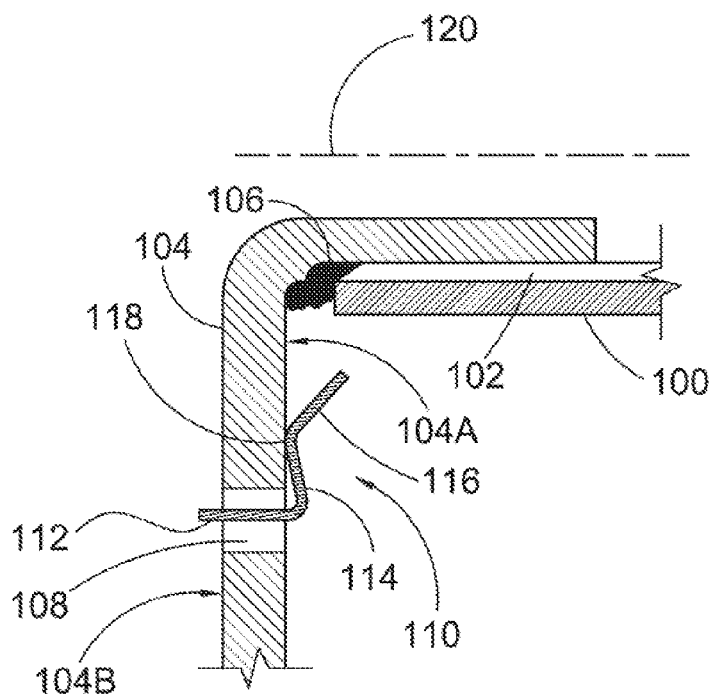
FIG. 4 is a cross-sectional view of an input shaft and flange according to the current invention including a grease trap mounted to the flange.

FIG. 4 illustrates an engagement of input shaft 100 with flange 104, which substantially resemble input shaft 10 and flange 14. Splines 102 are included on the input shaft for engaging with splines (hidden) on the flange. Input shaft 100 and flange 104 rotate about axis 120. Grease 106, like grease 28 in FIG. 3, is being urged toward the hysteresis package due to the rotation of the flange. Flange 104, unlike flange 14, includes apertures 108 with which to mount grease trap 110 against surface 104A of the flange.

Figure 5:
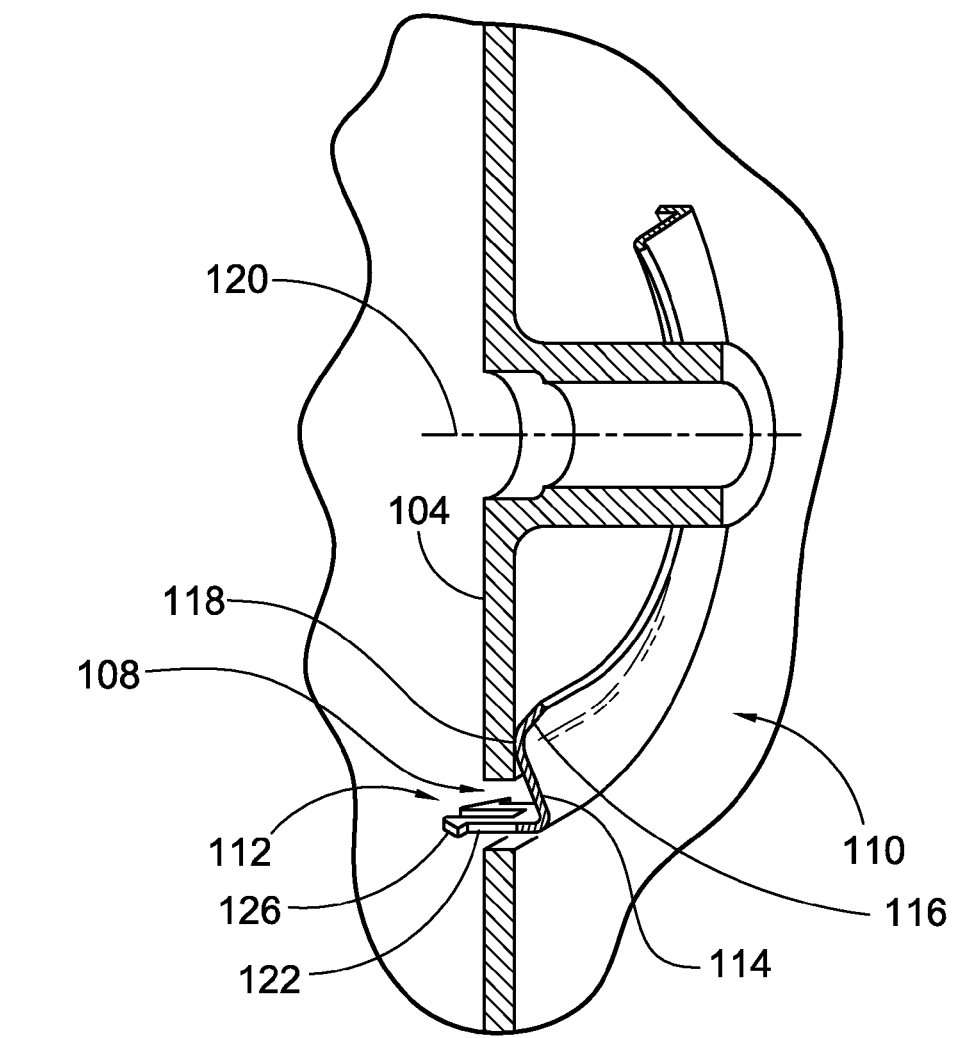
FIG. 5 a perspective cross-section showing a grease trap mounted to a flange according to the current invention.
Figure 6:
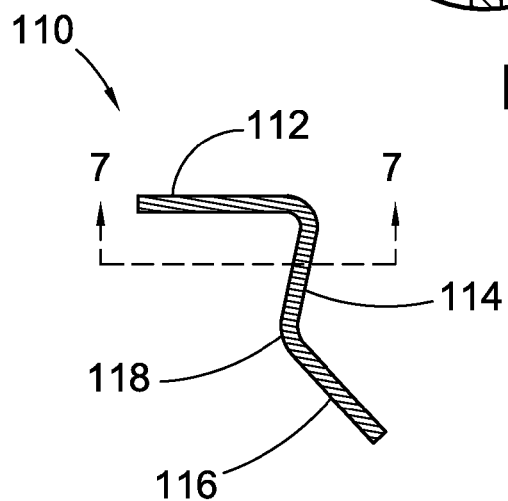
FIG. 6 is a cross-sectional view of the grease trap shown in FIGS. 4 and 5; and, FIG. 7 is a partial cross-section of the grease trap taken generally along line 7-7 in FIG. 6.
Figure 7:
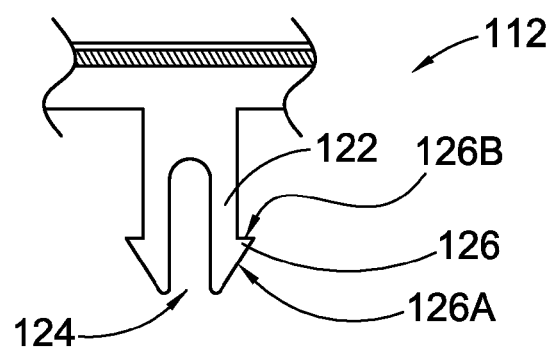

The following description refers to FIGS. 4-7. Splines are not shown on the flange, nor is the input shaft shown in FIG. 5, but it should be understood that they would both be included in an actual embodiment, as FIG. 5 is primarily included to illustrate the structure of grease trap 110. Grease trap 110 is substantially ring shaped and includes snaps 112 which are inserted into apertures 108 in flange 104. Only one snap (and one aperture) is shown, but in a preferred embodiment, the grease trap includes a plurality of snaps to ensure the grease trap is securely mounted against the plate. In the shown preferred embodiment, each snap 112 includes two prongs 122 which are separated by gap 124. Each prong terminates in one-way catch 126.

Apertures 108 are sized so that snaps 112 can be passed through them in one direction due to angled portion 126A of one-way catch 126, but so that catch portion 126B catches on the flange, and will not allow the snaps to be removed from the apertures. Prongs 122 are preferably made from a resilient material, such as spring steel, so that the prongs can flex inward, slightly closing gap 124 while angled portions 126A are being pressed through an aperture, and then return to their original orientation once the one-way catches are through the apertures. Thus, it should be clear that the one-way catches are oriented so that when snaps 112 are aligned with apertures 108 in flange 104, and the grease trap is pressed towards the flange, the one-way catches can pass through the apertures in one direction, but can not be removed from the apertures in the opposite direction.

In a preferred embodiment, section 114 of grease trap 110 is spring-loaded to force grease retaining portion 118 tightly against surface 104A of flange 104 when snaps 112 are inserted into apertures 108 and catch portions 126B of one-way catches 126 are locked against surface 104B of flange 104. Since retaining portion 118 is pressed tightly against the flange, deflecting portion 116 of the grease trap retains the grease proximate to the input shaft or deflects the grease back towards the input shaft. Therefore grease is stopped from traveling radially down into the hysteresis package of the transmission system.

In addition to the apertures, the flange may include a groove aligned with retaining portion 118 of grease trap 110, so that portion 118 of the trap can engage in the groove, thereby mating more tightly against the flange for increased grease retaining capability. Additionally, snaps 112 could be completely eliminated and the grease trap could be alternatively mounted against the flange by rivets, screws, welding, adhesives, or any other method known in the art. Generally, these other methods would increase the time required to install the grease trap, and therefore the cost of producing the transmission system.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A transmission system comprising:
    a damper including a hysteresis package and a flange, wherein said flange includes a first set of splines;
    an input shaft having a second set of splines arranged about an interior of said input shaft, wherein said first set of splines form an engagement with said second set of splines for transferring torque between said input shaft and said flange, wherein grease is included between said first and second sets of splines for lubricating said engagement of said input shaft and said flange; and,
    a grease trap mounted to said flange located between said input shaft and said hysteresis package for restricting said grease from traveling radially down said flange and into said hysteresis package.

2. The transmission system recited in claim 1 wherein said flange includes a plurality of apertures, wherein said grease trap includes a plurality of snaps, with each snap corresponding to one of said apertures, wherein said grease trap is mounted to said flange by inserting said snaps into said apertures.

3. The transmission system recited in claim 2 wherein each of said snaps includes two prongs and a gap between said prongs, wherein each prong terminates in a one-way catch having an angled portion for enabling said one-way catch to pass through said apertures in a first direction, and wherein said one-way catch includes a catch portion for preventing said snaps from exiting said apertures in a second direction which is opposite from said first direction.

4. The transmission system recited in claim 1 wherein said grease trap includes a spring-loaded portion for pressing said grease trap against said flange for retaining grease in said grease trap.

5. The transmission system recited in claim 1 wherein said grease trap includes a deflection portion for deflecting said grease away from said hysteresis package and towards said input shaft.

6. The transmission system recited in claim 1 wherein said grease trap is fabricated from spring steel.

7. The transmission system recited in claim 1 wherein said grease trap is mounted to said flange by use of rivets, bolts, machine screws, or welding.

* * * * *